US009223548B2

(12) United States Patent
Murrett et al.

(10) Patent No.: US 9,223,548 B2
(45) Date of Patent: Dec. 29, 2015

(54) METHOD AND APPARATUS FOR PROVIDING AN APPLICATION CANVAS FRAMEWORK

(75) Inventors: Martin James Murrett, Portland, OR (US); Christopher E. Rudolph, Camas, WA (US); Kevin Raemon Glyn Smyth, Vancouver (CA)

(73) Assignee: Apple Inc., Cupertino, CA (US)

( * ) Notice: Subject to any disclaimer, the term of this patent is extended or adjusted under 35 U.S.C. 154(b) by 890 days.

(21) Appl. No.: 12/283,878

(22) Filed: Sep. 15, 2008

(65) Prior Publication Data

US 2010/0070887 A1    Mar. 18, 2010

(51) Int. Cl.
G06F 3/048    (2013.01)
G06F 9/44    (2006.01)
G06F 17/30    (2006.01)

(52) U.S. Cl.
CPC .............. *G06F 8/38* (2013.01); *G06F 17/3089* (2013.01); *G06F 17/30873* (2013.01); *G06F 17/30905* (2013.01)

(58) Field of Classification Search
CPC .......... G06F 17/3089; G06F 17/30873; G06F 17/30905; G06F 8/38
USPC ........................................................ 715/760
See application file for complete search history.

(56) References Cited

U.S. PATENT DOCUMENTS

| | | | | |
|---|---|---|---|---|
| 5,761,686 A * | 6/1998 | Bloomberg | .................... | 715/234 |
| 5,765,176 A * | 6/1998 | Bloomberg | .................... | 715/209 |
| 5,781,189 A * | 7/1998 | Holleran et al. | ............. | 715/826 |
| 6,026,433 A * | 2/2000 | D'Arlach et al. | ............. | 709/217 |
| 6,313,824 B1 * | 11/2001 | Meisner et al. | ............... | 345/589 |
| 6,356,908 B1 * | 3/2002 | Brown et al. | ......................... | 1/1 |
| 6,741,242 B1 * | 5/2004 | Itoh et al. | ....................... | 345/419 |
| 6,931,600 B1 * | 8/2005 | Pittman | ......................... | 715/767 |
| 7,000,184 B2 * | 2/2006 | Matveyenko et al. | ........ | 715/235 |
| 7,089,530 B1 * | 8/2006 | Dardinski et al. | ............ | 717/105 |
| 7,096,465 B1 * | 8/2006 | Dardinski et al. | ............ | 717/178 |
| 7,237,193 B1 * | 6/2007 | Zaky et al. | ..................... | 715/207 |
| 7,272,815 B1 * | 9/2007 | Eldridge et al. | .............. | 717/101 |
| 7,624,342 B2 * | 11/2009 | Matveyenko et al. | ........ | 715/255 |
| 7,627,658 B2 * | 12/2009 | Levett et al. | ................... | 709/223 |
| 7,703,013 B1 * | 4/2010 | Bauermeister et al. | ....... | 715/255 |
| 7,716,352 B2 * | 5/2010 | Leetaru et al. | ................ | 709/229 |
| 7,814,425 B1 * | 10/2010 | O'Shaugnessy et al. | ..... | 715/752 |
| 2002/0135621 A1 * | 9/2002 | Angiulo et al. | ............... | 345/838 |
| 2004/0201609 A1 * | 10/2004 | Obrador | ........................ | 345/723 |
| 2004/0250205 A1 * | 12/2004 | Conning | ........................ | 715/517 |
| 2005/0210414 A1 * | 9/2005 | Angiulo et al. | ............... | 715/838 |
| 2006/0174198 A1 * | 8/2006 | Brown et al. | .................. | 715/530 |
| 2007/0094611 A1 * | 4/2007 | Sasaki | ........................... | 715/804 |
| 2007/0242082 A1 * | 10/2007 | Lathrop et al. | ................ | 345/619 |
| 2007/0266115 A1 * | 11/2007 | Levin | ............................ | 709/217 |

(Continued)

*Primary Examiner* — Anil Bhargava
(74) *Attorney, Agent, or Firm* — Downey Brand LLP (57) ABSTRACT

One embodiment of the present invention provides a system for providing an application canvas framework which facilitates the manipulation of text and graphics within a web browser. During operation, the system receives a command from a user at a web browser to execute a web-based application. In response to the command, the system loads the web-based application which includes an application canvas framework within the web browser, wherein the application canvas framework provides a Graphical User Interface (GUI) that facilitates the manipulation of text and graphics within the web browser. Note that the application canvas framework can be browser independent and/or platform independent.

20 Claims, 5 Drawing Sheets
(1 of 5 Drawing Sheet(s) Filed in Color)

(56) References Cited

U.S. PATENT DOCUMENTS

| | | | |
|---|---|---|---|
| 2008/0060032 A1* | 3/2008 | Toutenhoofd | 725/105 |
| 2008/0182665 A1* | 7/2008 | Sharps et al. | 463/42 |
| 2009/0044128 A1* | 2/2009 | Baumgarten et al. | 715/738 |
| 2009/0055406 A1* | 2/2009 | Kubono et al. | 707/10 |
| 2009/0172551 A1* | 7/2009 | Kane et al. | 715/733 |

* cited by examiner

METHOD AND APPARATUS FOR PROVIDING AN APPLICATION CANVAS FRAMEWORK

BACKGROUND

1. Field of the Invention

The present invention generally relates to web browsers. More specifically, the present invention relates to a method and an apparatus for providing an application canvas framework which facilitates the manipulation of text and graphics within a web browser.

2. Related Art

With the advent of new web technologies, many organizations are opting to develop web-based applications in lieu of their desktop counterparts. Web-based applications enjoy the benefit of cross-platform functionality. Additionally, web-based applications can be accessed from almost any computing device that has access to the Internet, rather than being tied to a specific machine.

While web-based applications have many advantages over desktop applications, they also have significant drawbacks. Traditionally, web-based applications offer only a fraction of the functionality that is offered by desktop applications. Furthermore, many of the advanced features offered by web-based applications require special browser plug-ins that are specific to a particular Operating System (OS) or browser. Moreover, security features of most browsers complicate interactions between web-based applications and the host OS, such as file system operations.

Hence, what is needed is a method and an apparatus for deploying web-based applications without the problems listed above.

SUMMARY

One embodiment of the present invention provides a system for providing an application canvas framework which facilitates the manipulation of text and graphics within a web browser. During operation, the system receives a command from a user at a web browser to execute a web-based application. In response to the command, the system loads the web-based application which includes an application canvas framework within the web browser, wherein the application canvas framework provides a Graphical User Interface (GUI) that facilitates the manipulation of text and graphics within the web browser. Note that the application canvas framework can be browser independent and/or platform independent.

In some embodiments of the present invention, the system displays one or more thumbnails within the web browser that represent one or more corresponding pages of content within the web-based application. Next, the system receives a modification command from the user to modify a current page within the web-based application, wherein the current page is associated with a thumbnail. In response to the modification command, the system modifies the current page within the web-based application. Next, the system sends an instruction to a web server to update the thumbnail corresponding to the current page. In response to the instruction, the system updates the thumbnail at the web server. The system then receives the updated thumbnail from the web server at the web browser. Finally, the system displays the updated thumbnail within the web browser.

In some embodiments of the present invention, the system updates the thumbnail at the web server by rendering the current page. The system then identifies an important feature in the current page. Next, the system creates an image of the current page that focuses on the important feature. Finally, the system resizes the image of the current page into the thumbnail.

In some embodiments of the present invention, the system receives a drag-and-drop command from the user at the web browser, wherein the user dragged an image onto the web browser from a local computer which is executing the web browser. In response to the drag-and-drop command, the system uploads the image to the web server. Next, the system resamples the image if necessary and translates the image into a web-safe format at the web server. Finally, the system renders the translated image inside the web browser at a location where the drag-and-drop command dropped the image.

In some embodiments of the present invention, the system receives a drag-and-drop command from the user at the web browser, wherein the user dragged an image onto the web browser from a web page being served from a third-party server. In response to the drag-and-drop command, the system sends a Uniform Resource Locator (URL) of the image to the web server. Next, the system uses the URL at the web server to retrieve a copy of the image from the third-party server. The system then hosts the copy of the image at the web server. Finally, the system renders the copy of the image inside the web browser at a location where the drag-and-drop command dropped the image.

In some embodiments of the present invention, the system periodically saves a state of the web-based application at the web server.

In some embodiments of the present invention, the system receives a command from the user at the web-based application to implement a function within the web-based application. In response to the command, the system implements the function within the web-based application.

In some embodiments of the present invention, the function is accessible via a browser menu.

In some embodiments of the present invention, the application canvas framework is comprised of at least one of: HyperText Markup Language (HTML), Cascading Style Sheets (CSS), and JavaScript™.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for providing an application canvas framework which facilitates the manipulation of text and graphics within a web browser. During operation, the system receives a command from a user at a web browser to execute a web-based application. In response to the command, the system loads the web-based application which includes an application canvas framework within the web browser, wherein the application canvas framework provides a Graphical User Interface (GUI) that facilitates the manipulation of text and graphics within the web browser. Note that the application canvas framework can be browser independent and/or platform independent.

Also note that the application canvas framework is a generic framework that can be implemented in virtually any type of web-based application. For example, these web-based applications can include: word-processing applications, note-taking applications, wiki applications, presentation applications, graphics-editing applications, social-networking applications, etc.

In some embodiments of the present invention, the system displays one or more thumbnails within the web browser that represent one or more corresponding pages of content within the web-based application. Next, the system receives a modification command from the user to modify a current page within the web-based application, wherein the current page is associated with a thumbnail. In response to the modification command, the system modifies the current page within the web-based application. Next, the system sends an instruction to a web server to update the thumbnail corresponding to the current page. In response to the instruction, the system updates the thumbnail at the web server. The system then receives the updated thumbnail from the web server at the web browser. Finally, the system displays the updated thumbnail within the web browser.

For example, consider a web-based publishing application that assists a user in designing and publishing a book. The user may be presented with the layout of a specific page, as well as a task pane or similar area that includes thumbnails of all of the pages in the book project, including the current page. As the content on each page is updated, the system updates each corresponding thumbnail in pseudo real-time.

In some embodiments of the present invention, the system updates the thumbnail at the web server by rendering the current page. The system then identifies an important feature in the current page. Next, the system creates an image of the current page that focuses on the important feature. Finally, the system resizes the image of the current page into the thumbnail.

For example, if a page contains mostly text and a large image, the system may focus on the image, while retaining some of the text, to help the user to subsequently identify the page. Focusing on important features while creating thumbnails may be a user-configurable option.

In some embodiments of the present invention, the system receives a drag-and-drop command from the user at the web browser, wherein the user dragged an image onto the web browser from a local computer which is executing the web browser. In response to the drag-and-drop command, the system uploads the image to the web server. Next, the system resamples the image if necessary and translates the image into a web-safe format at the web server. Finally, the system renders the image inside the web browser at a location where the drag-and-drop command dropped the image.

For example, if a user grabs a picture from his or her desktop, and drags the picture onto the web-based application, the web-based application can place a hidden upload form underneath the location where the user dropped the picture and can thereby upload the picture to the web server.

In some embodiments of the present invention, the system receives a drag-and-drop command from the user at the web browser, wherein the user dragged an image onto the web browser from a web page being served from a third-party server. In response to the drag-and-drop command, the system sends a Uniform Resource Locator (URL) of the image to the web server. Next, the system uses the URL at the web server to retrieve a copy of the image from the third-party server. The system then hosts the copy of the image at the web server. Finally, the system renders the copy of the image inside the web browser at a location where the drag-and-drop command dropped the image.

Note that in some embodiments of the present invention, the system may simply "hotlink" to the existing image on the third-party server; however, if the image was changed or removed from the third-party server, then the image would no longer be available in the web-based application.

In some embodiments of the present invention, the system periodically saves a state of the web-based application at the web server. In this way, the web server is used as a persistent storage for the web-based application, similar to a local disk drive for a traditional desktop application.

In some embodiments of the present invention, the system receives a command from the user at the web-based application to implement a function within the web-based application. In response to the command, the system implements the function within the web-based application.

For example, the web-based application may implement all of the traditional built-in functions of the host OS, such as undo/redo and cut/copy/paste.

In some embodiments of the present invention, the function is accessible via a browser menu. Note that this can include accessing the function through the menu bar, as well as through right-click or alternate-click menus.

In some embodiments of the present invention, the application canvas framework is comprised of at least one of: HyperText Markup Language (HTML), Cascading Style Sheets (CSS), and JavaScript™.

Note that in some embodiments of the present invention, only platform-independent and browser-independent technologies are used. For example, in one embodiment of the present invention, all of the functionality described herein is implemented solely with HTML, CSS, and JavaScript™, and does not include Adobe® Flash®.

Computing Environment

Figure 1:
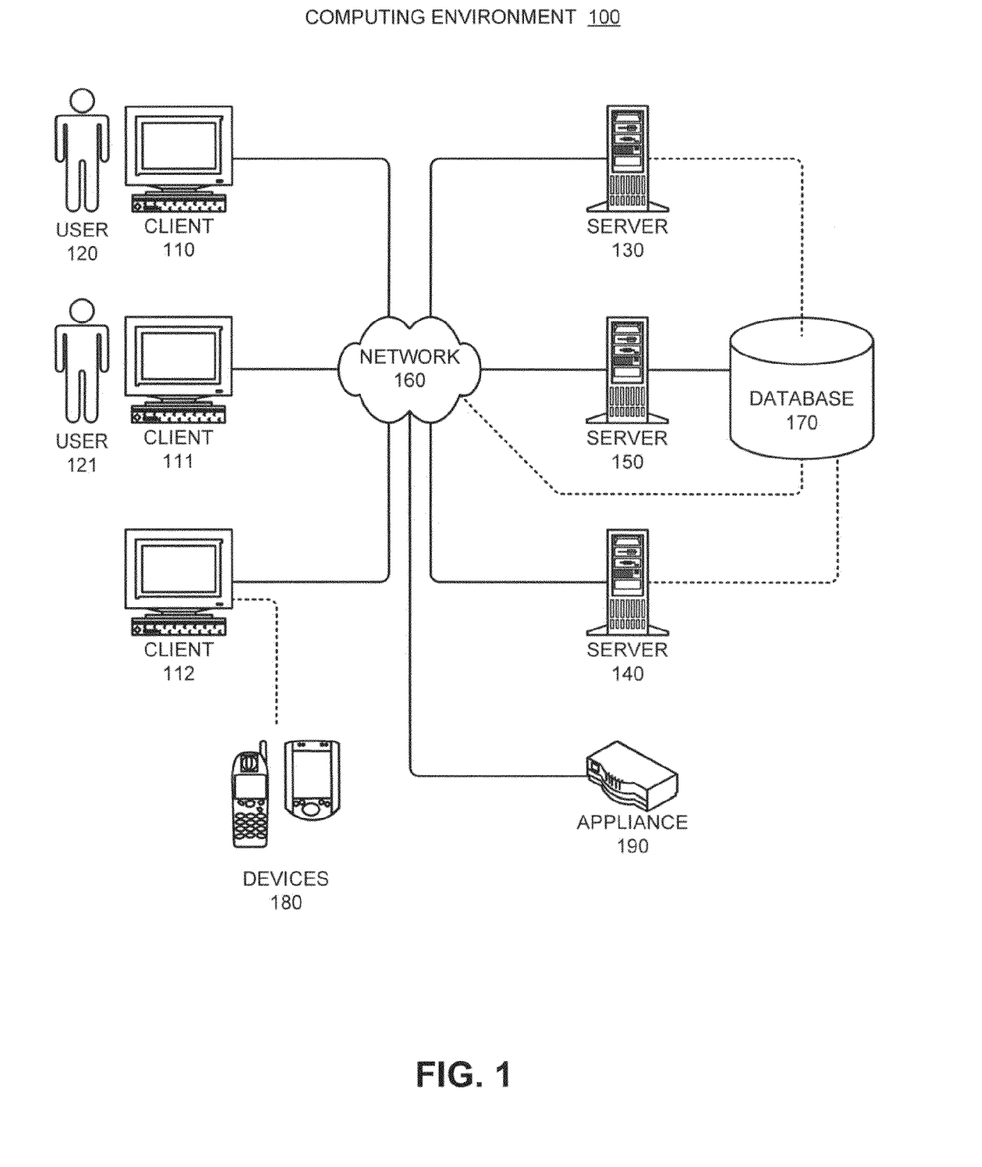
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

Apparatus

Figure 2:
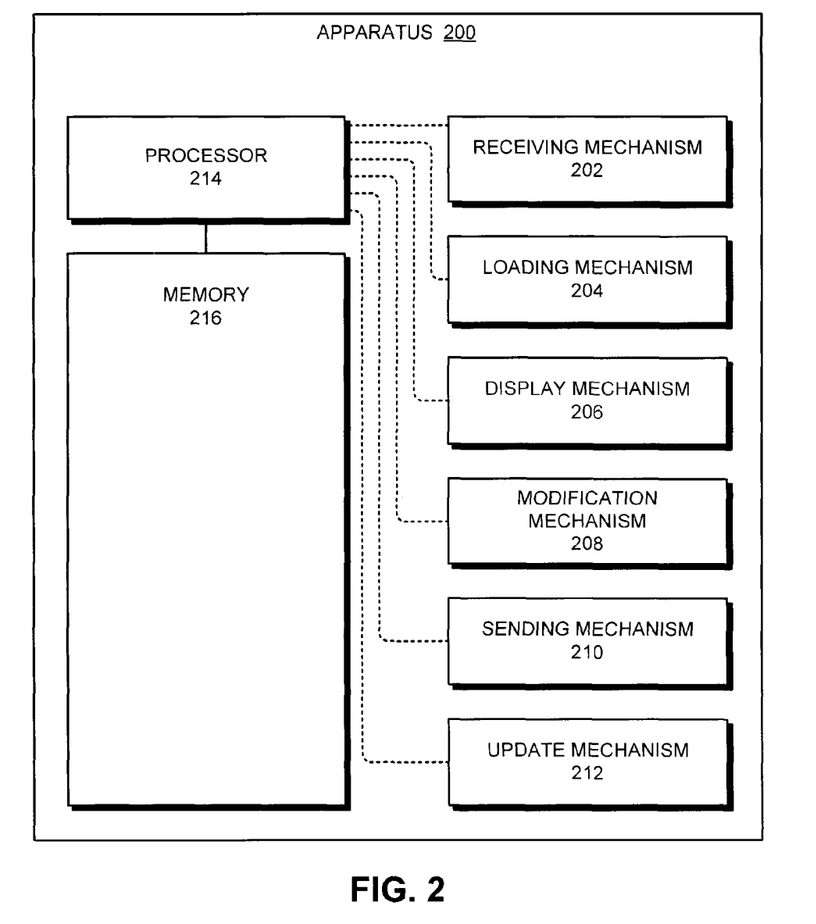
FIG. 2 illustrates an apparatus in accordance with an embodiment of the present invention.
Figure 3:
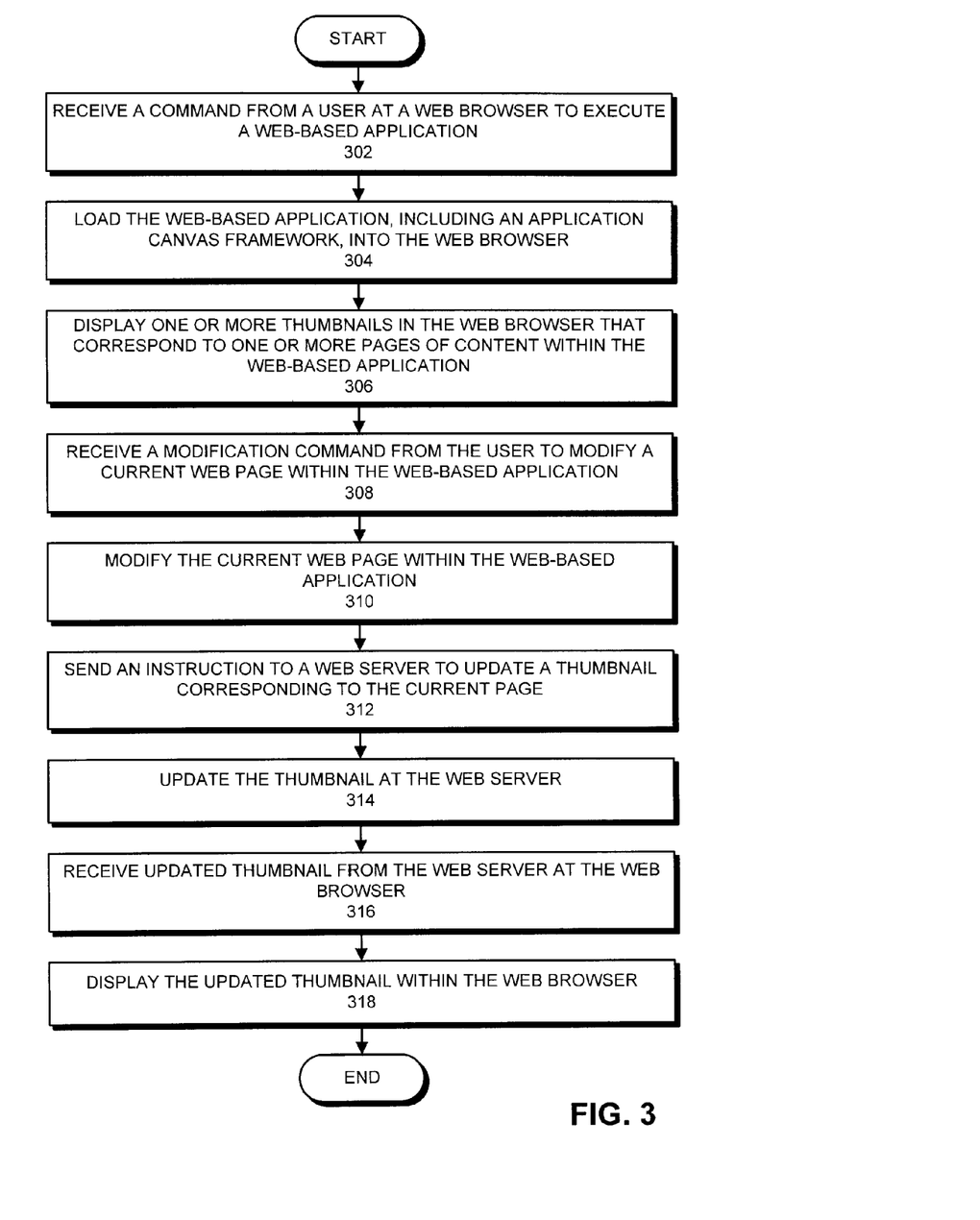
FIG. 3 presents a flow chart illustrating the process of implementing an application canvas framework in accordance with an embodiment of the present invention.
Figure 4:
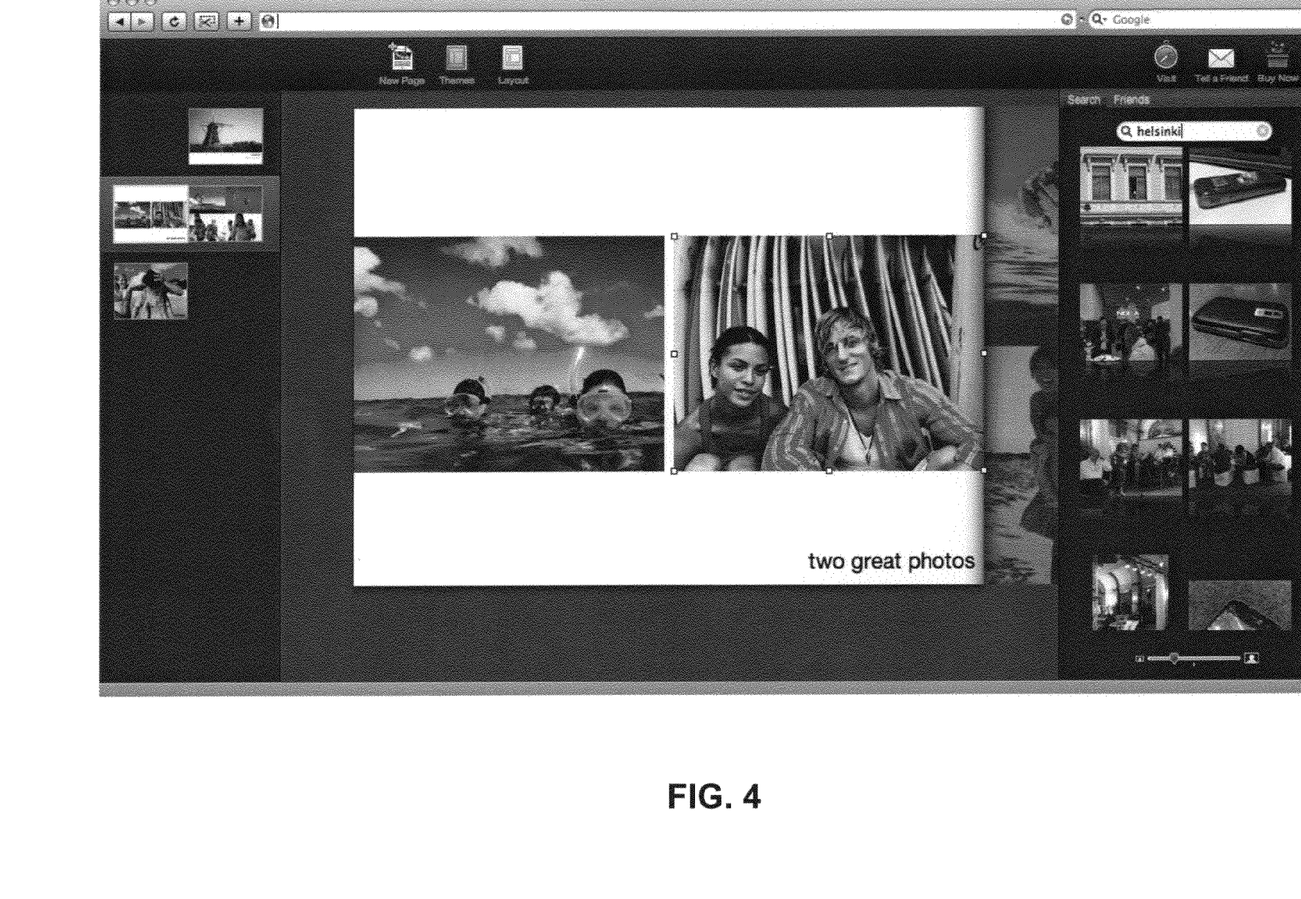
FIG. 4 illustrates a screenshot in accordance with an embodiment of the present invention.

FIG. 2 illustrates an apparatus 200, and FIG. 3 presents an associated flow chart illustrating the process of implementing an application canvas framework in accordance with an embodiment of the present invention. Moreover, FIG. 4 illustrates an associated screenshot in accordance with an embodiment of the present invention.

Apparatus 200, which for example can comprise client 110, includes receiving mechanism 202, loading mechanism 204, display mechanism 206, modification mechanism 208, sending mechanism 210, update mechanism 212, processor 214, and memory 216.

During operation, receiving mechanism 202 receives a command from user 120 at a web browser to execute a web-based application (operation 302). In response to this command, loading mechanism 204 loads the web-based application, which includes an application canvas framework, within the web browser (operation 304). Note that the application canvas framework provides a Graphical User Interface (GUI) that facilitates the manipulation of text and graphics within the web browser, and the application canvas framework is browser independent and platform independent.

Next, display mechanism 206 displays one or more thumbnails within the web browser that represent one or more corresponding pages of content within the web-based application (operation 306). As illustrated in FIG. 4, these thumbnails are visible on the left-hand side of web-based application.

Next, receiving mechanism 202 receives a modification command from user 120 to modify a current page within the web-based application (operation 308), wherein the current page is associated with a thumbnail. Modification mechanism 208 then modifies the current page within the web-based application in response to the modification command (operation 310).

Next, sending mechanism 210 sends an instruction to web server 150 to update the thumbnail corresponding to the current page (operation 312). Update mechanism 212 then updates the thumbnail at web server 150 in response to the instruction (operation 314). Once the thumbnail is updated, receiving mechanism 202 receives the updated thumbnail from web server 150 at the web browser (operation 316). Finally, display mechanism 206 displays the updated thumbnail within the web browser (operation 318).

Dragging Images from the Local Computer to the Web-Based Application

Figure 5:
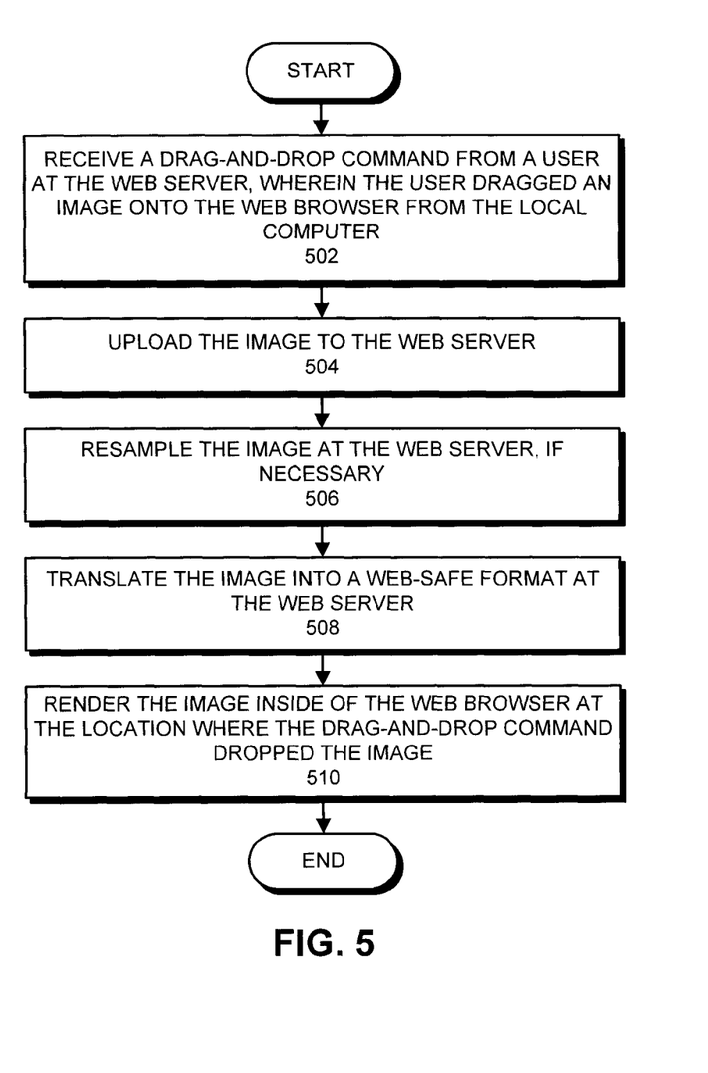
FIG. 5 presents a flow chart illustrating the process of dragging a desktop image to the web-based application in accordance with an embodiment of the present invention.

FIG. 5 presents a flow chart illustrating the process of dragging a desktop image to the web-based application in accordance with an embodiment of the present invention.

During operation, the system receives a drag-and-drop command from user 120 at the web browser, wherein the user dragged the image onto the web browser from a local computer, client 110, which is executing the web browser (operation 502).

Note that in some embodiments of the present invention, the image may be dragged to the web browser from other applications, as well as from other web browser windows displaying web pages from third-party web servers. In these embodiments, the system simply retrieves the image from the source location, including downloading the image from a third-party web server.

Next, in response to the drag-and-drop command, the system uploads the image to the web server (operation 504). The system then resamples the image at the web server, if necessary (operation 506). Next, the system translates the image into a web-safe format at the web server (operation 508). Finally, the system renders the translated image inside the web browser at a location where the drag-and-drop command dropped the image (operation 510).

Note that in some embodiments of the present invention, the system supports dragging images from the web-application back to the client 110. In these embodiments, the system simply downloads the image file and saves it to the location where the image was dragged. Furthermore, while the description above relates to dragging images to the web-based application, embodiments of the present invention are not limited to images. Other files, such as sound files, movies, spreadsheets, and documents, can be delivered to the web-based application in the same manner.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing a web application that facilitates manipulation of graphics, the method comprising:
   receiving a dragged image onto a current page of the web application served by a first web server, wherein the dragged image is dragged from a web page being served by a second web server that is different than the first web server;
   sending a Uniform Resource Locator (URL) associated with the dragged image to the first web server;
   rendering a copy of the dragged image inside the web application using the URL;
   creating a thumbnail image of the current page of the web application that includes a representation of a graphical feature provided in the web page;
   displaying the thumbnail image within the web application; and
   when the dragged image is modified on the second web server:
      updating, using the URL, the thumbnail image of the current page to reflect the modification of the dragged image.

2. The method of claim 1, wherein displaying the thumbnail image within the web application comprises displaying the thumbnail image in a first interface located adjacent to a second interface at which the current page is displayed within the web application.

3. The method of claim 2, wherein updating the thumbnail image of the current page includes resizing the dragged image at the first web server.

4. The method of claim 2, wherein receiving the updated thumbnail image comprises updating the thumbnail image in a first panel by replacing the thumbnail image in the first panel with the updated thumbnail image.

5. The method of claim 1, further comprising:
   receiving a drag-and-drop command from a user at the web application in response to the user dragging an image onto the current page, wherein the drag-and-drop command indicates a location inside the current page at which the image is to be placed.

6. The method of claim 1, further comprising:
   receiving a command at the web application to implement an image editing function within the web application; and
   in response to the command, implementing the image editing function within the web application.

7. The method of claim 6, wherein the image editing function is accessible via a browser menu.

8. The method of claim 1, wherein the application framework is comprised of at least one of: HyperText Markup Language (HTML), Cascading Style Sheets (CSS), and JavaScript™.

9. The method of claim 1, wherein the current page includes multiple images that are represented in the thumbnail image.

10. The method of claim 9, wherein a location of the copy of the dragged image within the current page is based on a drag and drop command at the web application.

11. A non-transitory computer-readable storage medium storing instructions that when executed by a computer cause the computer to perform steps that include:
   receiving a dragged image onto a current page of a web application served by a first web server, wherein the dragged image is dragged from a web page being served by a second web server that is different than the first web server;
   sending a Uniform Resource Locator (URL) associated with the dragged image to the first web server;
   rendering a copy of the dragged image inside the web application using the URL;
   creating a thumbnail image of the current page of the web application that includes a representation of a graphical feature provided in the web page;
   displaying the thumbnail image within the web application; and
   when the dragged image is modified on the second web server:
      updating, using the URL, the thumbnail image of the current page to reflect a modification of the dragged image.

12. The non-transitory computer-readable storage medium of claim 11, wherein the current page includes multiple images that are reflected in the thumbnail image.

13. The non-transitory computer-readable storage medium of claim 12, wherein updating the thumbnail image comprises:
   creating an image of the current page that focuses on the graphical feature; and
   resizing the image of the current page into the thumbnail image.

14. The non-transitory computer-readable storage medium of claim 13, wherein the steps further include:
   resampling the image at the first web server.

15. The non-transitory computer-readable storage medium of claim 11, wherein the steps further include periodically saving a state of the web application at the first web server.

16. The non-transitory computer-readable storage medium of claim 10, wherein the steps further include:
   receiving a command at the web application to implement an image editing function within the web application; and in response to the command, implementing the image editing function within the web application.

17. The non-transitory computer-readable storage medium of claim 16, wherein the image editing function is accessible via a browser menu.

18. The non-transitory computer-readable storage medium of claim 11, wherein the web application is comprised of at least one of: HyperText Markup Language (HTML), Cascading Style Sheets (CSS), and JavaScript™.

19. An apparatus for providing a web application that facilitates manipulation of graphics, the apparatus comprising:
   a processor; and
   a memory storing instructions that when executed by the processor cause the processor to:
   receive a dragged image onto a current page of the web application served by a first web server, wherein the dragged image is dragged from a web page being served by a second web server that is different than the first web server;
   send a Uniform Resource Locator (URL) of the dragged image to the first web server;
   render a copy of the dragged image inside the web application using the URL;
   create a thumbnail image of the current page that includes a representation of a graphical feature provided in the web page;
   display the thumbnail image within the web application; and
   when the dragged image is modified on the second web server:
      updating, using the URL, the thumbnail image of the current page to reflect the modification of the dragged image.

20. The apparatus of claim 19, further comprising:
a resampling mechanism configured to resample the current page.

* * * * *